D. J. HOOVER.
REVOLVING TOOTH FOR HARROWS.
APPLICATION FILED MAR. 19, 1909.

937,607.  Patented Oct. 19, 1909.

Witnesses
William E. Linton,
P. M. Smith.

Inventor
Daniel J. Hoover
By Victor J. Evans
Attorney

UNITED STATES PATENT OFFICE.

DANIEL J. HOOVER, OF MANSFIELD, OHIO.

REVOLVING TOOTH FOR HARROWS.

937,607.  Specification of Letters Patent.  Patented Oct. 19, 1909.

Application filed March 19, 1909. Serial No. 484,385.

*To all whom it may concern:*

Be it known that I, DANIEL J. HOOVER, a citizen of the United States, residing at Mansfield, in the county of Richland and State of Ohio, have invented new and useful Improvements in Revolving Teeth for Harrows, of which the following is a specification.

This invention relates to harrow teeth, the object of the invention being to provide a revolving harrow tooth or in other words a tooth having a plurality of pointed members certain of which are adapted to revolve around another under the action of the soil as the harrow is drawn across the field.

To the above end the invention consists in the novel construction, combination and arrangement of parts as herein fully described, illustrated and claimed.

Figure 1:
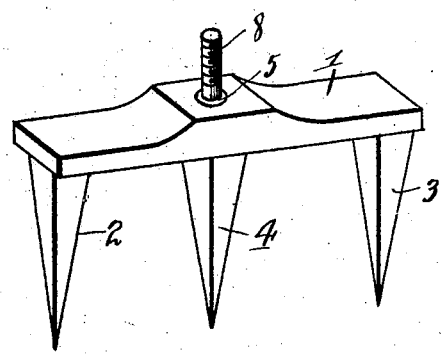
Figure 2:
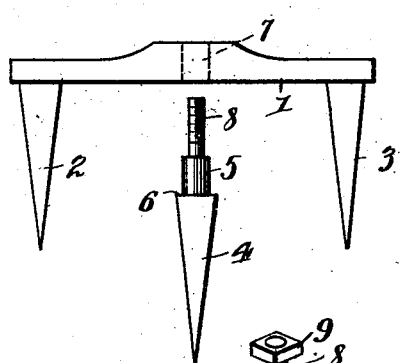
Figure 3:
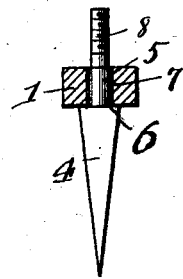
Figure 4:
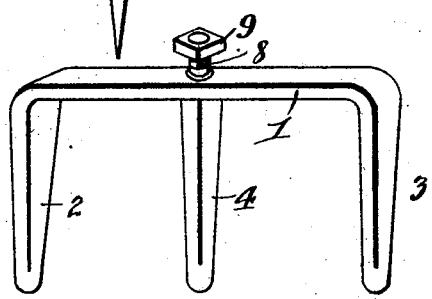

In the accompanying drawings:—Figure 1 is a perspective view of a revolving harrow tooth embodying the present invention. Fig. 2 is a side elevation of the same showing the center tooth or bearing stud detached from the bearing. Fig. 3 is a central transverse section through the complete tooth. Fig. 4 is a perspective view of a modified form of tooth.

The revolving harrow tooth of this invention comprises a connecting bar or yoke 1 to the opposite ends of which are permanently connected end teeth or pointed members 2 and 3.

Located between the pointed members or the teeth 2 and 3 is a center tooth 4 which is provided with a reduced cylindrical journal or bearing stud 5 leaving a shoulder 6. The bar or yoke 1 is provided with a central opening 7 to receive the journal or stud 5, the shoulder 6 resting against the under side of said bar or yoke 1 as shown in Fig. 3. Above the bar 1, the stud 5 is further reduced and threaded to form a screw shank 8 upon which is placed a retaining nut 9 which connects the center tooth to the bar or yoke 1.

From the foregoing description it will be seen that the outer teeth or pointed members 2 and 3 are adapted, together with the bar or yoke 1, to turn upon and around the journal 5 of the bearing stud, the center tooth 4 being the only one which is held in fixed relation to the frame of the harrow. The revolving harrow tooth may be connected to the frame of the harrow in any convenient manner as by inserting the threaded stud 8 through an opening in one of the harrow frame bars and placing the retaining nut 9 thereon.

If desired the yoke or bar 1 and the end teeth or pointed members 2 and 3 may be formed out of a single blank bent into proper form as shown in Fig. 4, the bar or yoke being provided with a central opening for the bearing stud of the center tooth 4.

Having thus described the invention what is claimed as new is:—

A revolving harrow tooth embodying a plurality of pointed members, two outer members and one center member, a horizontal bar rigidly connecting the two outer members and formed with a center bearing opening, and the center member being formed with a shouldered bearing fitting the opening in the bar and adapting said bar and its pointed members to revolve thereon as a center.

In testimony whereof I affix my signature in presence of two witnesses.

DANIEL J. HOOVER.

Witnesses:
 FRED R. STECKER,
 HENRY HEYER.